US012017330B2

(12) United States Patent
Lin

(10) Patent No.: US 12,017,330 B2
(45) Date of Patent: Jun. 25, 2024

(54) RATCHET SCREWDRIVER STRUCTURE

(71) Applicant: YIH CHENG FACTORY CO., LTD., Nantuo (TW)

(72) Inventor: Jack Lin, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 122 days.

(21) Appl. No.: 17/511,524

(22) Filed: Oct. 26, 2021

(65) Prior Publication Data

US 2023/0125126 A1 Apr. 27, 2023

(51) Int. Cl.
*B25B 15/04* (2006.01)
*B25G 1/06* (2006.01)

(52) U.S. Cl.
CPC .............. *B25B 15/04* (2013.01); *B25G 1/063* (2013.01)

(58) Field of Classification Search
CPC ................................ B25B 15/04; B25G 1/063
USPC ............................................................... 81/60
See application file for complete search history.

(56) References Cited

U.S. PATENT DOCUMENTS 5,848,680 A * 12/1998 Rinner .................... B25B 15/04 81/62
6,370,988 B1 * 4/2002 Thompson ............ B25B 13/463 81/63.1
7,287,448 B2 * 10/2007 Hu ........................ B25B 13/463 81/62
8,806,987 B2 * 8/2014 Chen ...................... B25B 15/04 81/63.1

FOREIGN PATENT DOCUMENTS

TW M433926 U1 7/2012

OTHER PUBLICATIONS

Office Action dated Jun. 28, 2022 of the corresponding Taiwan patent application No. 110130545.

* cited by examiner

*Primary Examiner* — Hadi Shakeri
(74) *Attorney, Agent, or Firm* — Chun-Ming Shih; HDLS IPR SERVICES

(57) ABSTRACT

The present disclosure is a screwdriver. A rotating seat includes a turntable and a plurality of locking blocks. A driving rod set includes a driving rod and a ratchet gear, and the ratchet gear is located in the turntable. A retaining set includes a tooth block and an elastic piece. The tooth block includes a plurality of teeth, and the elastic piece abuts a driving plate and the tooth block. A driving seat set includes a driving seat and a positioning set, and the positioning set includes a spring and a positioning piece. A locking block is inserted between the tooth block and the ratchet gear, so that the locking tooth is locked or separated from the ratchet gear.

9 Claims, 6 Drawing Sheets

RATCHET SCREWDRIVER STRUCTURE

BACKGROUND

Technical Field

The present disclosure is related to a hand tool, in particular to a ratchet screwdriver structure.

Description of Related Art

A function of a screwdriver is to turn a screw, and the screwdriver is one of a necessary hand tool in daily life. Considering the convenience of use, some ratchet screwdriver that may control a use direction has been developed on the market.

Generally, the use direction restriction of the ratchet screwdriver is achieved through a setting of a ratchet driving assembly. The ratchet driving assembly is composed of a ratchet, an elastic element, a locking block pushed by the elastic element, a toggle part and other elements. In actual use, the locking block is pushed by rotating the toggle part, so that the locking block may selectively lock the ratchet, and then achieve a purpose of restricting the use direction.

However, after the structure of the ratchet driving assembly is used for a long time, the elastic element may experience elastic fatigue or the toggle part is not rotated to a right position, which may cause the elastic element to be unable to push the locking block to a proper position, such that the ratchet screwdriver may not be used normally.

Therefore, the inventor of the present disclosure focused on related art above-mentioned, and made great efforts to solve the problems above-mentioned, which became a goal of the present disclosure.

SUMMARY

A purpose of the present disclosure is to provide a ratchet screwdriver structure to simplify an overall structure of a ratchet screwdriver.

In order to achieve the purpose above-mentioned, the present disclosure provides a ratchet screwdriver structure, the ratchet screwdriver structure includes a handle, a rotating seat, a driving rod set, a retaining set, and a driving seat set. The rotating seat is combined with the handle, the rotating seat includes a turntable and a plurality of locking blocks, and the turntable includes a plurality of positioning grooves. The driving rod set includes a driving rod and a ratchet gear is combined with the driving rod, one end of the driving rod is arranged in the handle, and the other end of the driving rod penetrates the turntable so that the ratchet gear is located in the turntable. The retaining set is arranged in the turntable, the retaining set includes a pair of tooth blocks and a pair of elastic pieces, and each of the tooth blocks includes a plurality of teeth. The driving seat set includes a driving seat and a positioning set, and the driving seat includes a driving disk penetrating the turntable. One side of the driving disk includes a cavity, and the positioning set includes a spring and a positioning piece abutting against the spring. The spring is arranged in the cavity, and the positioning piece protrudes from the plurality of positioning grooves. Two ends of the pair of elastic pieces elastically abut against the driving disk and the pair of tooth blocks respectively, so that the plurality of teeth elastically latch the ratchet gear, and the turntable is rotated to make the positioning piece selectively positioned on one of the plurality of positioning grooves, each of the plurality of locking blocks is selectively inserted between the tooth blocks and the ratchet gear, so that the plurality of teeth are locked or separated from the ratchet gear.

Compared with the related art, the retaining set of the ratchet screwdriver of the present disclosure includes the pair of tooth blocks and the pair of elastic pieces, and each of the tooth blocks includes a plurality of teeth and a pushing slide. When the plurality of locking blocks is pushed against the tooth blocks, the plurality of locking blocks is attached to the pushing slide so that the plurality of locking blocks may reliably push the tooth blocks away from the ratchet gear. In addition, the retaining set may arrange a support plate between the tooth blocks and turntable. The support plate is composed of metal sheet, which may avoid friction loss between the tooth blocks and the turntable, and may increase a service life of the tooth blocks and a practicability of the present disclosure.

DETAILED DESCRIPTION

The technical content and detailed description of the present disclosure are now described with the drawings as follows. The present disclosure is not limited thereof.

Figure 1:
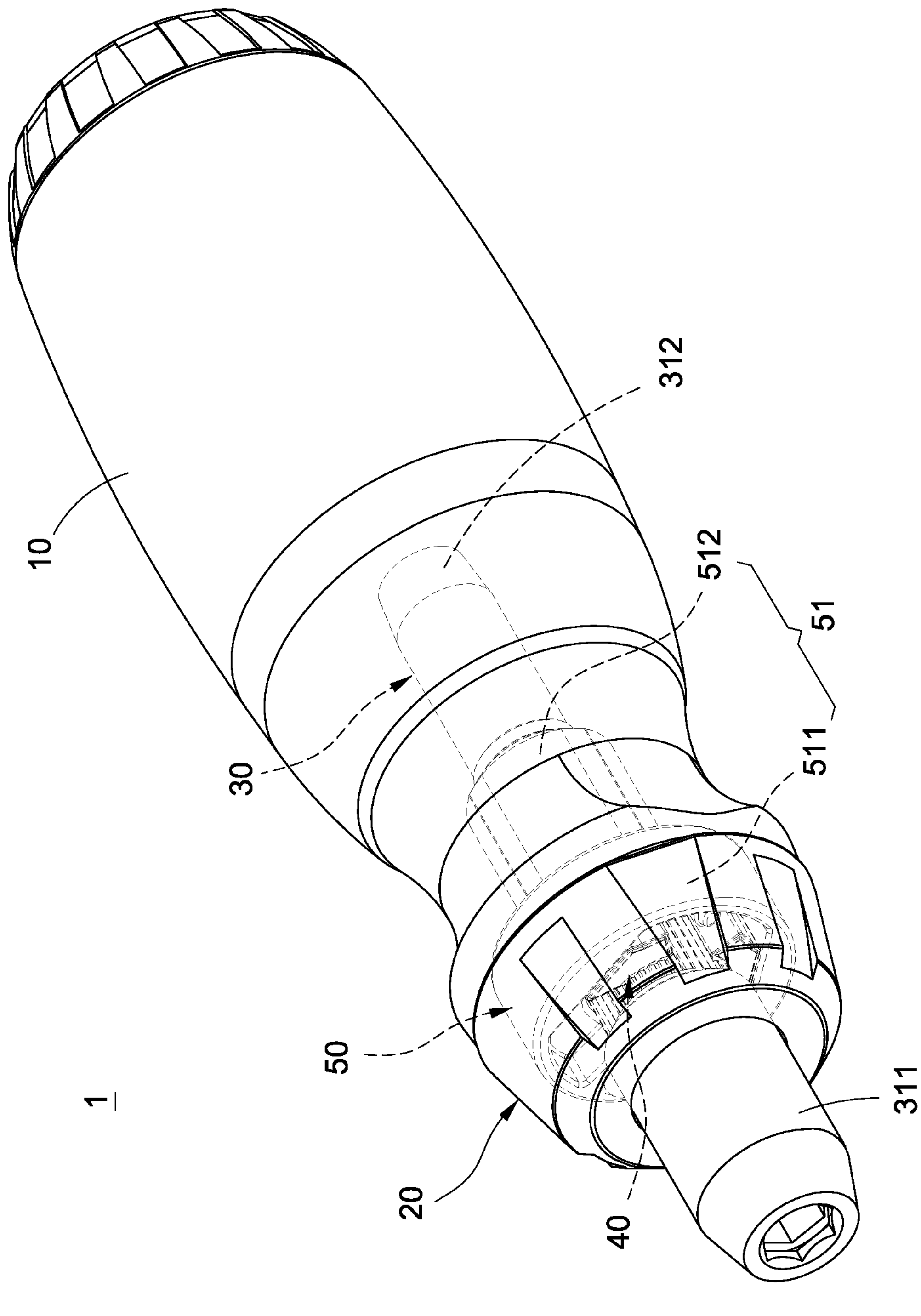
FIG. 1 is a perspective view of a ratchet screwdriver structure of the present disclosure.
Figure 2:
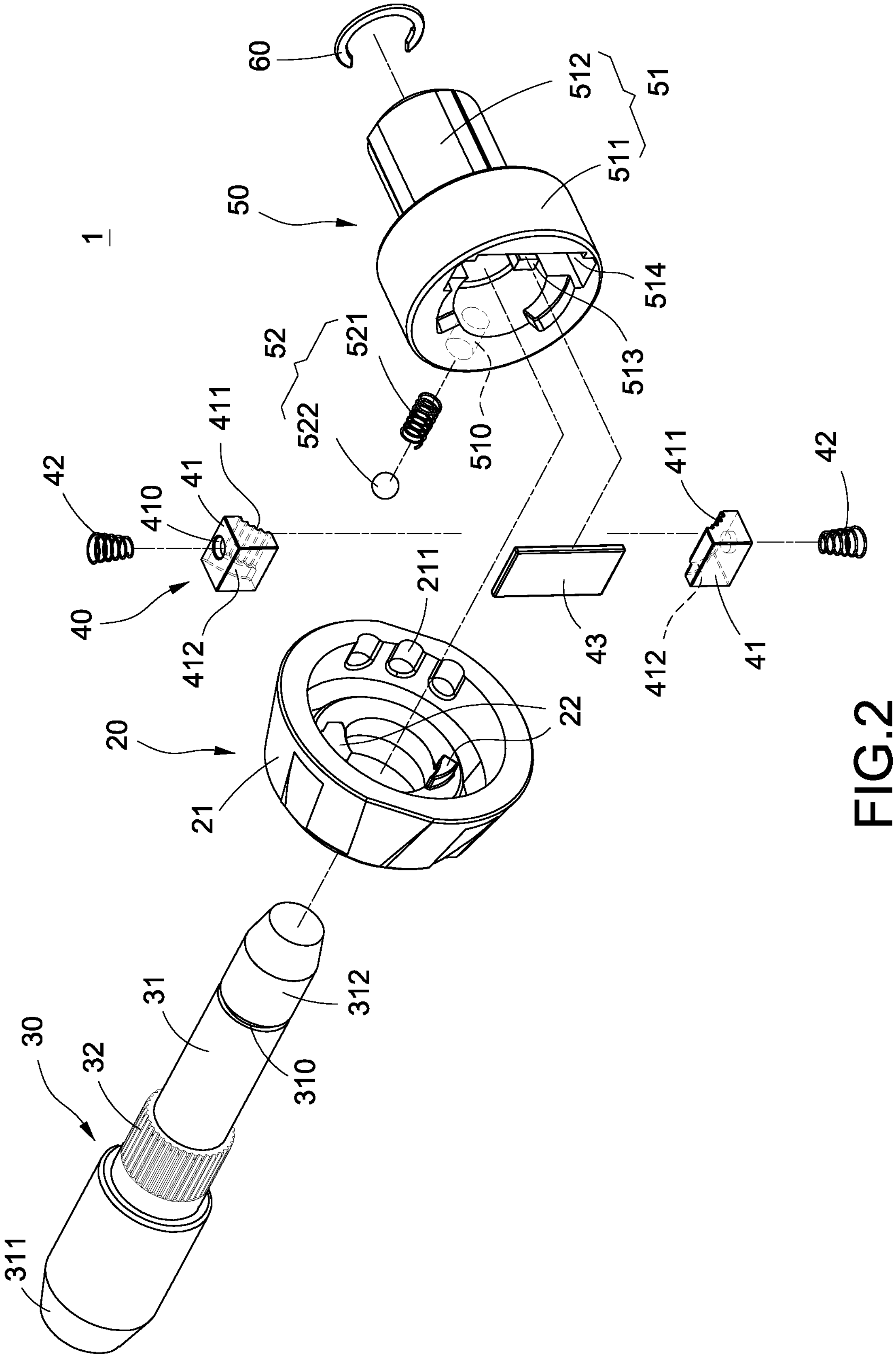
FIG. 2 is a perspective exploded schematic diagram of the ratchet screwdriver structure of the present disclosure.
Figure 3:
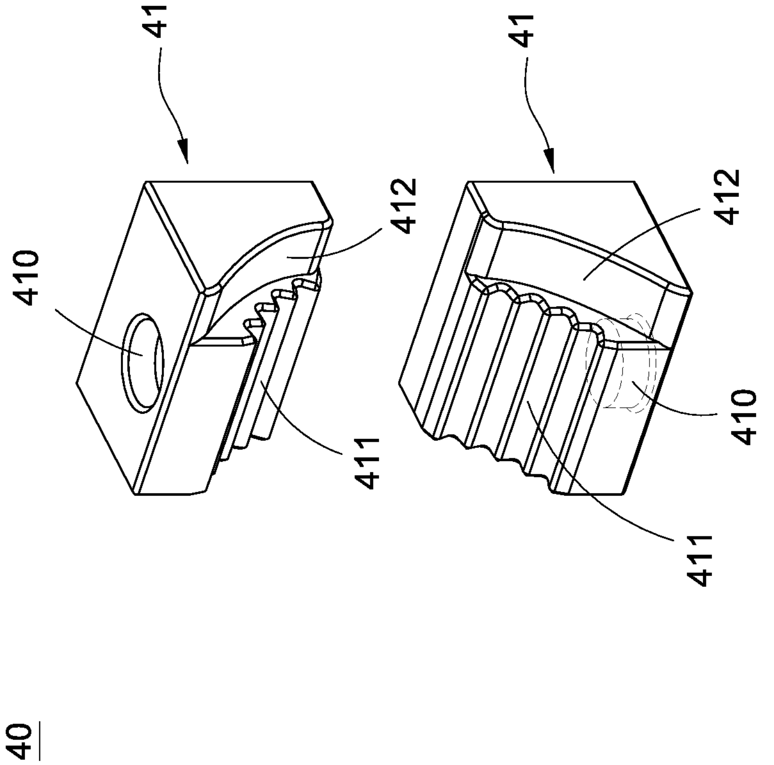
FIG. 3 is a perspective view of the pair of tooth blocks of the present disclosure.
Figure 4:
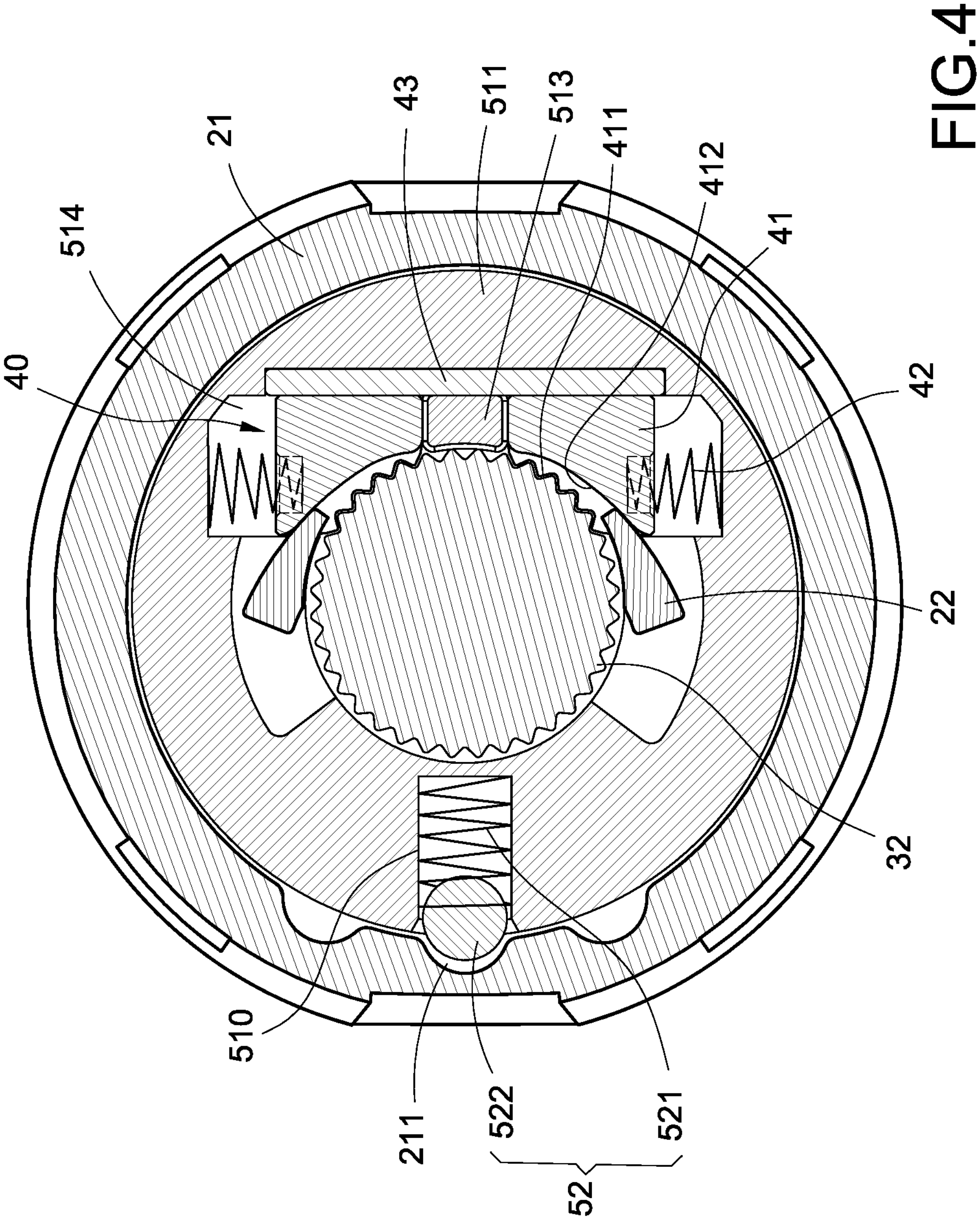
FIG. 4 is a cross-sectional view of the ratchet screwdriver structure after being assembled of the present disclosure.

Please refer to FIG. 1 to FIG. 4. FIG. 1 is a perspective view of a ratchet screwdriver structure of the present disclosure. FIG. 2 is a perspective exploded schematic diagram of the ratchet screwdriver structure of the present disclosure. FIG. 3 is a perspective view of the pair of tooth blocks of the present disclosure. FIG. 4 is a cross-sectional view of the ratchet screwdriver structure after being assembled of the present disclosure. The ratchet screwdriver structure includes a handle 10, a rotating seat 20, a driving rod set 30, a retaining set 40, and a driving seat set 50. The rotating seat 20 is combined with the handle 10, and the driving rod set 30 penetrates the handle 10 and the rotating seat 20. The driving seat set 50 is combined with the rotating seat 20, and the driving seat set 50 and the rotating seat 20 jointly provide a moving space of the retaining set 40.

As shown in FIG. 2, the rotating seat 20 is combined with the handle 10. The rotating seat 20 includes a turntable 21 and a plurality of locking blocks 22, and the turntable 21 includes a plurality of positioning grooves 211. In this embodiment, the plurality of locking blocks 22 are arranged inside the turntable 21 at intervals. In addition, the plurality of positioning grooves 211 are arranged on an inner surface of the turntable 21. The driving rod set 30 includes a driving rod 31 and a ratchet gear 32 is combined with the driving rod 31. One end of the driving rod 31 is arranged in the handle 10 and the other end of the driving rod penetrates the turntable 21 so that the ratchet gear 32 is located in the turntable 21. In this embodiment, the driving rod 31 has a tool end 311 and a coupling end 312 opposite to each other. The tool end 311 protrudes from the turntable 21, and the coupling end 312 is fixed in the handle 10.

The retaining set 40 is arranged in the turntable 21, the retaining set 40 includes a pair of tooth blocks 41 and a pair of elastic pieces 42. Each of the tooth blocks 41 includes a plurality of teeth 411.

It should be noted that each of the tooth blocks 41 includes a pushing slide 412 on one side of the plurality of teeth 411. When the plurality of locking blocks 22 are pushed against the tooth blocks 41, one side of the plurality of locking blocks 22 is attached to the pushing slide 412 so that the plurality of locking blocks 22 may reliably push the tooth blocks 41 away from the ratchet gear 32.

In addition, each of the tooth blocks 41 includes an opening 410, each of the elastic pieces 42 is, for example, a spring, and one end of each of the elastic pieces 42 penetrates the opening 410.

In an embodiment of the present disclosure, the retaining set 40 further includes a support plate 43 which is arranged between the pair of tooth blocks 41 and an inner surface of the turntable 21, used to separate the pair of tooth blocks 41 and the turntable 21 to avoid friction loss between the pair of tooth blocks 41 and the turntable 21, and may increase a service life of the pair of tooth blocks 41.

Furthermore, the driving seat set 50 includes a driving seat 51 and a positioning set 52. The driving seat 51 includes a driving disk 511 penetrating the turntable 21, and one side of the driving disk 511 includes a cavity 510. The positioning set 52 includes a spring 521 and a positioning piece 522 abutting the spring 521. The spring 521 is arranged in the cavity 510, the positioning piece 522 protrudes from the cavity 510, and the positioning piece 522 is selectively positioned in one of the pluralities of positioning grooves 211.

It should be noted that the driving disk 511 includes a stopper 513 and a plurality of sliding grooves 514. When the driving seat 51 penetrates the turntable 21, the pair of tooth blocks 41 are moved in the sliding grooves 514. In addition, the stopper 513 is pressed between the pair of tooth blocks 41, to position the pair of tooth blocks 41 to avoid excessive displacement of the pair of tooth blocks 41 toward each other, and prevent the pair of tooth blocks 41 from getting stuck, tripped or unable to be reset.

In this embodiment, the positioning piece 522 may be a ball. In addition, the driving seat 51 further includes a fixed cylinder 512 connected to the driving disk 511. The fixed cylinder 512 penetrates the coupling end 312 of the driving rod 31 and is fixed in the handle 10.

It should be noted that one end of the pair of elastic pieces 42 elastically abuts the driving disk 511, and the other end of the pair of elastic pieces 42 abuts the pair of tooth blocks 41 respectively, so that the plurality of teeth 411 elastically locks the ratchet gear 32.

In an embodiment of the present disclosure, the ratchet screwdriver structure 1 further includes a buckle 60. The driving rod 31 includes an annular groove 310. The buckle is buckled on the annular groove 310 and arranged between the driving rod 31 and the driving seat 51.

As shown in FIG. 4, when the ratchet screwdriver structure 1 of the present disclosure is used, the turntable 21 is rotated to make the positioning piece 522 selectively positioned on one of the pluralities of positioning grooves 211. Accordingly, each of the plurality of locking blocks 22 is selectively inserted between the tooth blocks 41 and the ratchet gear 32, so that the plurality of teeth is locked or separated from the ratchet gear 32.

It should be noted that in FIG. 4, the positioning piece 522 is positioned on the positioning groove 211 in the middle position, and the pair of locking blocks 22 are inserted between the pair of tooth blocks 41 and the ratchet gear 32 respectively. At this time, the tool end 311 (as shown in FIG. 1) may be rotated counterclockwise or clockwise.

Figure 5:
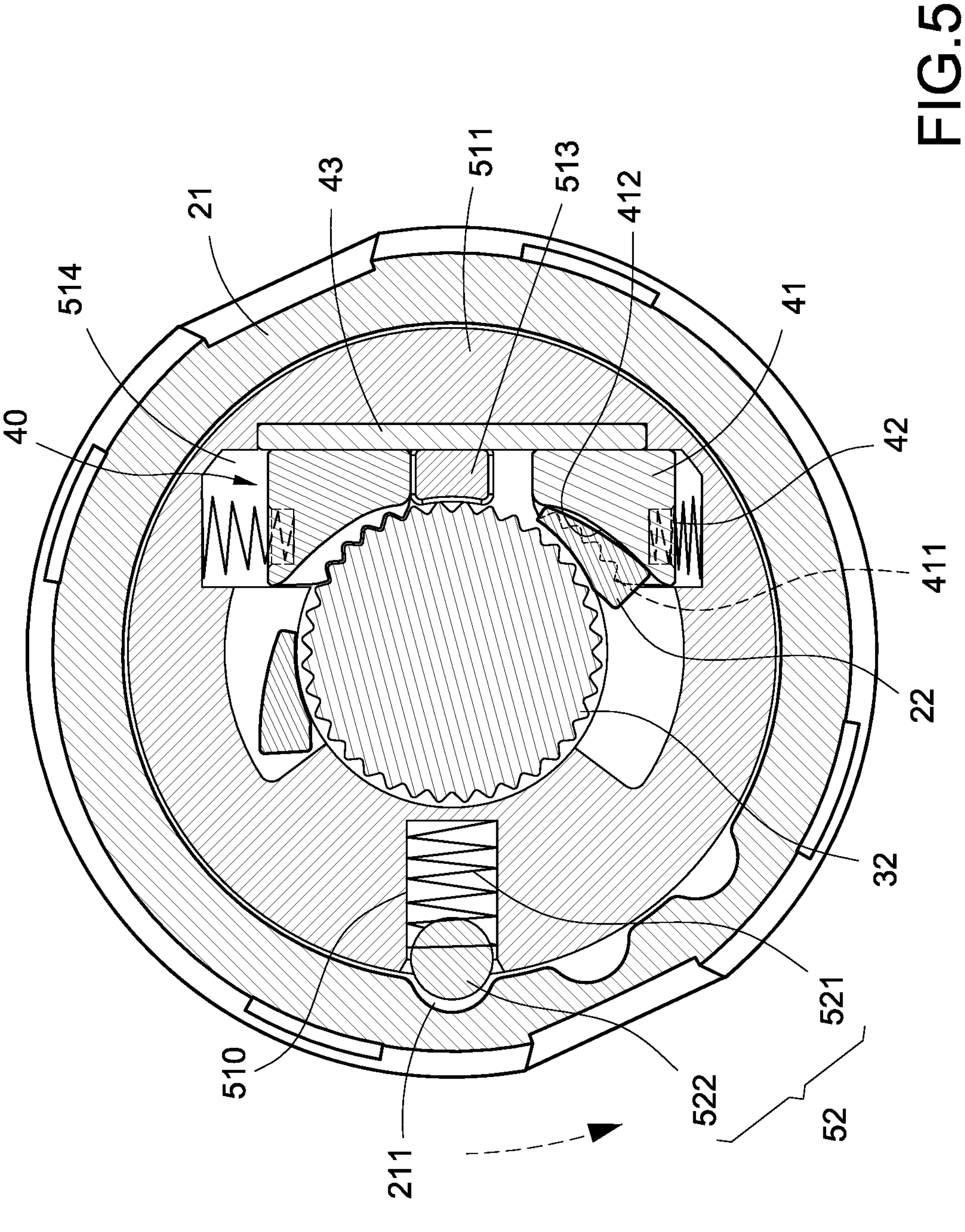
FIG. 5 and FIG. 6 are schematic diagrams for use the ratchet screwdriver structure of the present disclosure.
Figure 6:
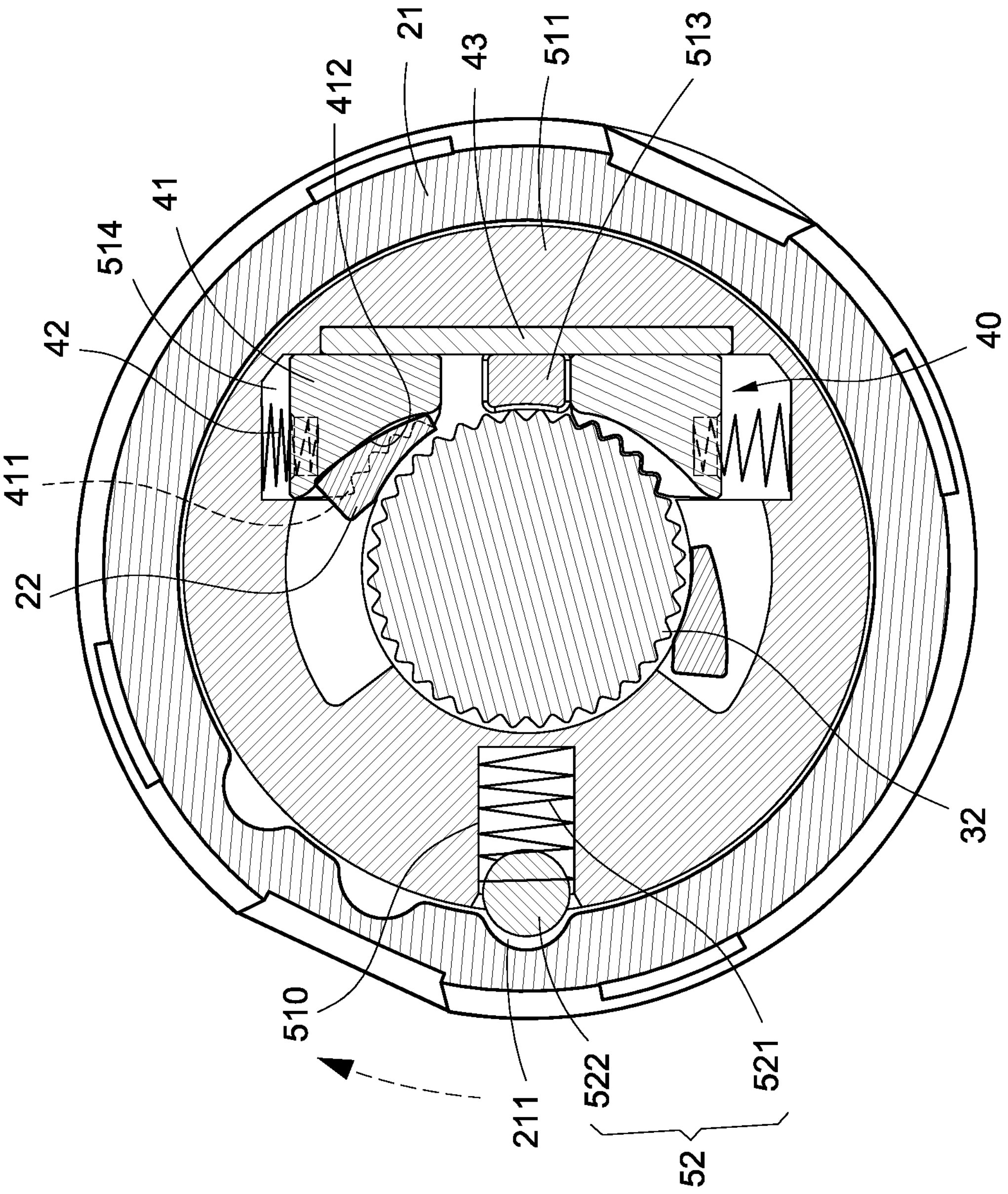

Please refer to FIG. 5 and FIG. 6, which are schematic diagrams for use the ratchet screwdriver structure of the present disclosure. In FIG. 5, when the turntable 21 is rotated counterclockwise, the positioning piece 522 will be positioned on the positioning groove 211 upper (left side of the middle positioning groove). The locking block 22 below will be inserted between the corresponding tooth block 41 and the ratchet gear 32, so that the tooth block 41 is out of the engagement of the ratchet gear 32. In addition, the locking block 22 upper will move out between the corresponding tooth block 41 and the ratchet gear 32, so that the tooth block 41 is engaged with the ratchet gear 32.

Meanwhile, the tool end 311 (as shown in FIG. 1) may drive the ratchet gear 32 to rotate counterclockwise. When the tool end 311 rotates in a clockwise direction, the ratchet gear 32 will be idling, thereby achieving a single-direction counterclockwise rotation operation.

As shown in FIG. 6, when the turntable 21 is rotated clockwise, the positioning member 522 will be positioned on the below positioning groove 211 (right side of the middle positioning groove). The locking block 22 upper will be inserted between the corresponding tooth block 41 and the ratchet gear 32, so that the tooth block 41 is out of the engagement of the ratchet gear 32. In addition, the locking block 22 below will move out between the corresponding tooth block 41 and the ratchet gear 32, so that the tooth block 41 is engaged with the ratchet gear 32. Accordingly, the tool end 311 (as shown in FIG. 1) may drive the ratchet gear 32 to rotate clockwise. When the tool end 311 rotates in a counterclockwise direction, the ratchet gear 32 will be idling, thereby achieving a single-direction clockwise rotation operation.

Some technical contents are only some embodiments of the present disclosure, and is not used to limit the scope of the present disclosure. Any modification of the structure, the change of the proportional relationship, or the adjustment of the size should be within the scope of the technical contents disclosed by the present disclosure without affecting the effects and the achievable effects of the present disclosure.

What is claimed is:

1. A ratchet screwdriver structure, comprising:

a handle;

a rotating seat, configured to combine with the handle, the rotating seat comprising a turntable and a pair of locking blocks, the turntable comprising a plurality of positioning grooves;

a driving rod set, comprising a driving rod and a ratchet gear configured to combine with the driving rod, one end of the driving rod configured to arrange in the handle, and the other end of the driving rod configured to penetrate the turntable so that the ratchet gear configured to locate in the turntable;

a retaining set, arranged in the turntable, the retaining set comprising a pair of tooth blocks and a pair of elastic pieces, each of the tooth blocks comprising a plurality of teeth to form a step portion and a pushing slide positioned along the plurality of teeth on one side of the plurality of teeth; and a driving seat set, comprising a driving seat and a positioning set, the driving seat comprising a driving disk configured to penetrate the turntable, one side of the driving disk comprising a cavity, and the positioning set comprising a spring and a positioning piece abutting against the spring, the spring arranged in the cavity, and the positioning piece configured to protrude from the plurality of positioning grooves;

wherein, two ends of each elastic piece elastically abut against the driving disk and the tooth block respectively, so that the plurality of teeth elastically latch the ratchet gear, and the turntable is rotated to make the positioning piece selectively positioned on one of the plurality of positioning grooves, each locking block is engaged on the pushing slide to selectively slide and insert between the tooth block and the ratchet gear, so that the plurality of teeth are locked or separated from the ratchet gear.

2. The ratchet screwdriver structure in claim 1, wherein the locking blocks are arranged at intervals inside the turntable; the plurality of positioning grooves are arranged on an inner surface of the turntable.

3. The ratchet screwdriver structure in claim 1, wherein the driving disk comprises a stopper, and the stopper is pressed between the pair of tooth blocks.

4. The ratchet screwdriver structure in claim 1, wherein the driving disk comprises a plurality of sliding grooves, and the pair of tooth blocks are moved in the sliding grooves.

5. The ratchet screwdriver structure in claim 1, wherein each of the tooth blocks comprises an opening, each of the elastic pieces is spring, and one end of each of the elastic pieces penetrates the opening.

6. The ratchet screwdriver structure in claim 1, wherein the retaining set further comprises a support plate which is arranged between the pair of tooth blocks and an inner surface of the turntable.

7. The ratchet screwdriver structure in claim 6, wherein the support plate is composed of metal sheet.

8. The ratchet screwdriver structure in claim 1, wherein the driving seat further comprises a fixed cylinder connected to the driving disk, and the fixed cylinder is configured to combine with the handle.

9. The ratchet screwdriver structure in claim 1, further comprises a buckle, the driving rod comprising an annular groove, and the buckle configured to buckle on the annular groove and arranged between the driving rod and the driving seat.

* * * * *